United States Patent Office 3,257,450
Patented June 21, 1966

3,257,450
ORGANIC HYPOCHLOROUS ACID DERIVATIVES AND A PROCESS FOR THEIR MANUFACTURE
Alfred R. Globus, Forest Hills, N.Y., assignor to Guardian Chemical Corporation, Long Island City, N.Y., a corporation of Delaware
No Drawing. Filed Feb. 28, 1963, Ser. No. 261,814
9 Claims. (Cl. 260—505)

This invention relates to the production of novel hypochlorous acid derivatives having chemotherapeutic properties, and is a continuation-in-part application of my copending application Serial No. 706,293, filed December 31, 1957, and now abandoned.

The novel chemotherapeutic organic hypochlorous acid derivatives in accordance with the invention are produced by the reaction of calcium hypochlorite with a neutral salt of a sulfonated or sulfated hydrocarbon in the presence of an inert salt and an acid compound capable of combining with the calcium atom of the hypochlorite compound the reaction taking place with the application of heat and under anhydrous conditions.

In accordance with the process of the present invention, substantially dry calcium hypochlorite is thoroughly admixed with an inert salt, such as sodium chloride or sodium phosphate, which serves as an inert medium. An alkali or alkali-earth salt of an alkyl, aryl, or alkaryl sulphonic acid and a solid organic or inorganic acid compound or a salt thereof is then added to the mixture.

The above ingredients, which should all be added in substantially anhydrous condition, are then preferably finely ground and thoroughly mixed. On application of heat a reaction takes place which should be continued for from 10 to 100 hours, depending on various factors which are hereinafter more fully explained.

The temperature range for heating the reaction components may be between 125° F. and 250° F. Temperatures above this range may cause decomposition of the product while temperatures below this range will be insufficient for the reaction to proceed properly.

The preferred temperature for carrying out the reaction is approximately 150° F. to 190° F., however. A temperature of 150° F. is advantageously employed for approximately twenty-four hours whereupon the temperature is preferably raised to 190° F. and held at this raised temperature for about another twenty-four hour period. The complete reaction time, therefore, amounts to about forty-eight hours when using a temperature of about 150° F. to about 190° F.

It will be appreciated that the exact duration of the reaction period will vary somewhat with the temperature used, as well as with the specific starting materials employed, and with variances in technique. Thus, by way of illustration, when a temperature of 160° F. is used, the reaction time is about 85 hours, while at a temperature of 255° F., the reaction time is about 10 hours.

In this connection, for the required reaction to take place efficiently, the reaction components must be in substantially dry condition. Hence, the components should contain preferably not more than 1% moisture under normal circumstances. In certain cases, nevertheless, the calcium hypochlorite may contain up to 3% moisture and the organic sulphonated up to 5% moisture.

Furthermore, all of the individual reaction components should be preferably of a fine and uniform particle size in order to enable the reaction to proceed uniformly at as low a temperature as possible and in the shortest desirable time. For this purpose the particles of the various reaction components should all be below 20 and preferably below 80 U.S. standard mesh size, but should preferably not be smaller than 200 mesh.

During the reaction considerable quantities of gases and vapors are liberated, consisting for the most part of water vapor, carbon monoxide, and chlorine.

Upon completion of the reaction, a white water-soluble powder is recovered in good yields, which has a pH ranging from about 4.5 to about 8, but generally in the slightly acid range from about 5.8 to about 6.7. The product so obtained has a characteristic organic odor which in some cases is commingled with the odor of hypochlorous acid which may be present as a consequence of the action of atmospheric moisture on the powder, and exhibits remarkable shelf-stability over extended periods of time, even at a temperature of 100° F., and is stable in water solutions as well.

The product obtained in accordance with the invention is a complex which has the formula $HO_nS-R \cdot HOCl$ in which $n$ is 3 or 4, and R is a hydrocarbon radical containing from 6 to 26, and preferably 16 to 22 carbon atoms.

Whether $n$ is 3 or 4 will depend on whether the starting neutral hydrocarbon salt is a sulfonated or sulfated hydrocarbon, and R will correspond to the hydrocarbon portion of this salt. Most preferably R is in the form of an alkaryl hydrocarbon radical having from 10 to 16 carbon atoms in the alkyl chain.

It should be noted that the process of the present invention may not be carried out with any degree of success in the absence of the inert salt, as mentioned above, as in such cases, the reaction becomes undesirably uncontrollable and leads to a dark burnt reaction mass.

In a preferred embodiment of the present invention a mild acid compound such as an acid salt, may be employed which may serve as both the solid acid component and the inert medium as well. Such mild acid compound must have a very low degree of inherent acidity to be considered suitable. In this case, it will be readily appreciated that higher quantities of the acid or acid salt will be required as its presence serves a dual function, as hereinabove pointed out.

The calcium hypochlorite which may be used in accordance with the process of the present invention may be any high test hypochlorite which contains advantageously from 65 to 72% available chlorine and no more than about 1 to 3% moisture. The proportional amount of calcium hypochlorite which may be used in the reaction mixture may be within the range of 2 to 40% by weight of the entire formulation, and preferably within the range of from 5 to 17% of the entire mixture.

The neutral hydrocarbon salt may be any substantially neutral salt of a sulfonated or sulfated hydrocarbon which shows wetting-agent properties. Among these are sodium, potassium, lithium, calcium and magnesium salts of alkyl, aryl, and alkaryl sulfonated hydrocarbons. Examples of these various hydrocarbons include alkyl hydrocarbons having 6 to 26, and preferably 10 to 14 carbon atoms in the chain, such as decane, undecane, dodecane, tridecane, tetradecane, pentadecane, hexadecane, heptadecane and octadecane; aryl, hydrocarbons such as benzene and naphthalene; and alkaryl hydrocarbons such as octyl-, nonyl-, decyl-, undecyl-, dodecyl-, tridecyl-, tetradecyl-, pentadecyl-, and hexadecyl-benzene.

Of these the alkyl hydrocarbons, although suitable, are the least desirable to work with, while the alkaryl hydrocarbons having from 10 to 16 carbon atoms in the alkyl chain are the most suitable. Additional suitable hydroxy substitued hydrocarbons include the long chain phenols, such as nonyl phenol, which upon subsequent application of known technique forms, for example, alkali nonyl phenolsulfonates, as well as higher alcohols, such as heptadecyl alcohol, which may be readily sulfated and neutralized.

Generally, hydrocarbon sulfonates are preferred over hydrocarbon sulfates since the latter compounds, although generally satisfactory for the purposes of the present invention, are more difficult to control in subsequent processing. In this same connection, amino or amido groups as substituents on the hydrocarbon radical have been found generally to be unsatisfactory, so that these groups are preferably omitted from the hydrocarbons coming into consideration.

The amount of organic sulfonate which may be used in the formulation may be within the range of 2 to 25% by weight of the entire reaction mixture, and preferably within the range of 5 to 15% of the total quantity of reaction components.

Suitable organic acid compounds and salts of organic and inorganic acids which may be employed in the present invention include any non-toxic dry, high melting solid organic acids or their anhydrides, having a melting point of at least 250° F. in the anhydrous state, such as citric, tartaric and maleic acids, their partially neutralized salts such as monosodium citrate, and glucono-delta-lactone. Additional acid components which may be suitably used include the double salts of sodium, potassium, lithium, magnesium, and calcium, of fairly strong acids such as phosphoric, citric and acetic acids. Among these are sodium acid phosphate, potassium diacetate, calcium acid phosphate and sodium acid citrate. Also complex phosphates with low pH values may be used, such as sodium dihydrogen phosphate, sodium acid pyrophosphate, hexametaphosphate and tetraphosphate. The latter two salts function as acids in relation to the alkine calcium hypochlorite since they are capable of neutralizing this compound and liberating hypochlorous acid. The alkali pyrosulphates and anhydrous bisulphates or their equivalents may also be used.

While the presence of the acid compounds is necessary for the reaction and in order to form the complex of the structure of the complex as set forth above, neither the organic acid compound nor parts thereof enter into the final structure of the novel complex and therefore the particular organic acid compound used will not alter the structure of the complex in accordance with the invention. Preferable acid compounds in accordance with the invention are:

(1) The acid sulphate of the alkali metals as represented by $Na_2SO_4 \cdot (H_2SO_4)_n$ in which $n$ is one or less.

(2) The acid phosphates of the alkali metals are represented by $K_3PO_4 \cdot (H_3PO_4)_n$ in which $n$ is one or less.

(3) The acid hydrocarbon sulphonates of the alkali metals in which the hydrocarbon may be an alkyl, aryl or alkyl aryl derivative as represented by sodium dodecylbenzene sulfonate·dodecylbenzene sulfonic acid in which the ratio of the free acid to the sodium salt is one or less.

(4) The alkali metal sulfates of the equivalent long-chain alcohol as potassium lauryl sulfate·lauryl sulphuric acid in which the free acid ratio to salt is again one or less.

(5) The alkali metal acid pyrophosphates as sodium acid pyrophosphate.

(6) The alkali metal salt of an edible, non-toxic acid in which the number of metallic atoms shall be one less than the number of carboxylic groups as represented by monolithium or dilithium citrate or monosodium gluconate.

The proportion of acid or acid salt compound which may be used in accordance with the present invention may be within the range of from 1 to 40% by weight of the entire formulation and preferably within the range of from 5 to 25% of the total reaction components.

The inert compound which serves as inert medium for the reaction may consist of anhydrous or substantially anhydrous neutral salts, such as sodium chloride or sodium monohydrogen phosphate. The inert component generally must consist of a salt which is somewhat soluble in water, as for example, a salt having a solubility in water of at least 0.5 gram per liter, and preferably at least 5 grams per liter. Additionally, the salt should be substantially neutral, having a pH of not more than 8.5. It must be unaffected by strong oxidizing agents, have a low hygroscopicity, and be capable of being dried to the anhydrous state.

In view of the temperature employed, the inert component must have a melting point of at least 250° F. and must necessarily be unreactive with any of the other ingredients and must not form calcium salts having a solubility at 20° F. of less than 0.15 gram/100 cc.

Thus, in addition to sodium chloride, sodium sulphate and sodium monohydrogen phosphate, any inorganic salt of sodium, potassium, lithium, calcium or magnesium with a strong acid, such as sulphuric, hydrochloric, nitric or phosphoric acids may be included as inert component as well as mixtures of these components.

In general however, it is of advantage to employ as inert component a compound having a common anion with that of the acid or acid salt component to be used.

The amount of inert component which may be used in accordance with the present invention may range generally from 5 to 45% by weight of the entire formulation of ingredients while the preferred range is from 25 to 65% by weight of the entire formulation.

In the event the said acid or acid salt component of the reaction mixture is also used as inert medium, the proportion of the acid or acid salt component which may be used will then include the quantity of inert medium, and the combined formulation of these two components may be within the range of from 30 to 95% by weight of the total formulation.

The heating process of the present invention is carried out preferably in ovens under a dry atmosphere or an inert gas, such as argon. The material is suitably contained for this purpose in corrosion-resistant trays. In order to promote the reaction, moreover, the product is advantageously turned over in the trays every hour or two.

Upon completion of the reaction, the products may be removed from the protecting atmosphere and quickly placed in corrosion-resistant drums which can then be sealed. It is preferred that the packing of the material be done under conditions of low humidity or in an atmosphere of inert gas as well to minimize contamination of the product and conversion to hypochlorous acid.

The product in accordance with the invention having the formula as set forth above, may also be obtained or converted into the form of its alkali salts such as sodium, lithium or potassium salts and these salts are useful as chemotherapeutic agents in the same manner as the complex per se, and when the term "product" is used hereinafter, these salts are included.

The product in accordance with the invention, when dissolved in an aqueous solution in concentrations of above .05% and preferably .1% to 1% constitutes a highly effective topical antiseptic for treating localized infections. The aqueous solution of the product may be applied by irrigation, spraying, soaking, or wet compresses and may be used for treating localized infections, particularly those involving highly resistant organisms, for removing any necrotic debris, for counteracting odorous discharges, and as a pre- and post-operative antiseptic. It has also been found that the dry product can be used as an antiseptic on the skin.

The product in the form of an aqueous solution, shows a completed spectrum being effective against bacteria, fungi, viruses and other unicelled organisms and may be therapeutically applied without toxicity, without allergic side reactions, systemic involvements or development of resistant organisms.

The following examples are set forth to illustrate the present invention, but it is to be understood that the present invention is not to be limited thereby. The parts used are parts by weight unless specifically otherwise stated.

Example 1

The following formulation is prepared by thoroughly grinding and admixing the amounts of ingredients set forth below:

| | Parts |
|---|---|
| Calcium hypochlorite | 10 |
| Sodium dodecylbenzene sulphonate | 3 |
| Sodium dihydrogen phosphate | 3 |
| Sodium monohydrogen phosphate | 78 |

These admixed components in finely ground form are then heated in a corrosion-resistant container in an oven having an anhydrous atmosphere, or one containing argon, at a temperature of about 150° F. The mass of ingredients is periodically turned over and further mixed for more efficient reaction. After 24 hours the temperature is raised to about 190° F. for an additional 24 hours. The final product is recovered in good yields as a white water-soluble powder with a pH ranging from about 4.5 to about 8 in aqueous solution of about .1 to 1% concentration.

Example 2

Example 1 was repeated using, however:

| | Parts |
|---|---|
| Calcium hypochlorite | 15 |
| Sodium pentadecyl-benzene sulphonate | 10 |
| Sodium dihydrogen phosphate | 3 |
| Sodium monohydrogen phosphate | 66 |

Example 3

The procedure of Example 1 is followed using the following ingredients:

| | Parts |
|---|---|
| Calcium hypochlorite | 10 |
| Sodium ethyl hexyl sulphonate | 15 |
| Sodium pyrosulphate | 5 |
| Sodium chloride | 60 |

Example 4

The procedure of Example 1 is followed using the following formulation:

| | Parts |
|---|---|
| Calcium hypochlorite | 10 |
| Calcium naphthalene sulphonate | 15 |
| Sodium acid pyrophosphate | 65 |

Example 5

The procedure of Example 1 is followed using the following formulation:

| | Parts |
|---|---|
| Calcium hypochlorite | 10 |
| Lithium nonyl phenol sulphonate | 15 |
| Citric acid | 7½ |
| Sodium chloride | 65 |

Example 6

The procedure of Example 1 is followed using the following formulation:

| | Parts |
|---|---|
| Calcium hypochlorite | 10 |
| Magnesium hexadecyl sulphonate | 15 |
| Sodium mono-citrate | 5 |
| Sodium dihydrogen phosphate | 5 |
| Sodium monohydrogen phosphate | 55 |

Example 7

The procedure of Example 1 is followed using the following formulation:

| | Parts |
|---|---|
| Calcium hypochlorite | 10 |
| Potassium nonyl sulphonate | 3 |
| Sodium pyrosulphate | 10 |
| Sodium chloride | 30 |
| Sodium monohydrogen phosphate | 30 |

Example 8

When the above examples were repeated, using in place of the sodium salts the corresponding sodium, potassium, lithium, calcium and magnesium salts in connection with the wetting agent, and the corresponding sodium, potassium, lithium, calcium or magnesium salts in connection with the inert medium compounds having similar properties were produced. In the same manner compounds with similar properties were produced when the organic acid compound was replaced by other organic acid compounds, such as tartaric acid, maleic acid, or corresponding potassium, lithium, magnesium, or calcium salts.

Example 9

In cases of gingival disease, a solution of 0.25% of the product of Example 1 was used as a mouthwash twice daily and showed in all cases tested a marked improvement at the end of one week. The use of the compounds of the present invention over an extended period also reduced secondary infection, arrested gingival bleeding and deodorized the mouth with no exceptions and wthout any accompanying ill effects. The products of the other examples produced similar results.

The bacterial potency of the compounds of the present invention may be seen from the following table:

TABLE

| Solution | Activity | Time |
|---|---|---|
| 0.28% | Kills tetanus spores | 5 minutes. |
| 0.5% | Renders tubercle bacilli harmless to guinea pigs. | 1 minute. |
| .008% | Kills Endamoeba histolytica | 48 hours. |
| 0.02% | Kills common bacteria | 1.5 minutes. |
| 0.025% | Kills cultures of Staphylococcus aureus | 5–10 seconds. |

These compounds furthermore, have a wide range of bactericidal action, and are not rendered ineffective with prolonged administration, as organisms do not develop resistance to them.

While preferred embodiments have been indicated in the foregoing specification and examples, it will be understood that various modifications may be made in the procedure for carrying out the present invention without departing from the spirit and scope of said invention, which is to be limited only by the appended claims.

I claim:

1. A process for the production of organic hypochlorus acid derivatives which comprises heating to a temperature between about 125 and 250° F. a mixture having a particle size below about 20 mesh, essentially consisting of about 2–40% by weight of a calcium hypochlorite component, about 2–25% by weight of a wetting agent selected from the group consisting of alkali, alkaline earth and magnesium alkyl-, alkaryl-, and aryl sulphonates and sulphates having at least 6 carbon atoms, about 1–40% by weight of a non-toxic solid acid compound capable of combining with the calcium of said hypochlorite, and selected from the group consisting of alkali metal acid sulphates, alkali metal acid phosphates, alkali metal acid pyrophosphates, alkali metal carboxylic acid salts in which the number of metallic ions is at least one less than the number of carboxylic groups, alkali metal hydrocarbon sulfonates, and alkali metal sulphates of long-chain alcohols, and about 5–45% by weight of an inert substantially anhydrous salt selected from the group consisting of alkali, alkaline earth, and magnesium salts in a substantially anhydrous atmosphere.

2. Process according to claim 1 in which said calcium hypochlorite is present in amount of about 5 to 17% by weight, said wetting agent in amount of about 5 to 15% by weight, said acid compound in amount of about 5 to 25% by weight and said substantially anhydrous inert salt in amount of about 25 to 65% by weight.

3. Process according to claim 1 in which said components have a particle size between about 80 and 200 mesh.

4. Process according to claim 1 in which the over-all moisture content of the components of the mixture is less than about 3%.

5. Process according to claim 1 in which said solid acid compound is a substantially anhydrous inert salt comprised of same ingredient.

6. Process for the production of organic hydrochlorous acid derivatives which comprises heating a mixture of about 2–40% by weight of a calcium hypochlorite having less than 3% moisture content, about 2–25% by weight of a wetting agent selected from the group consisting of alkali, alkaline earth, and magnesium alkyl-, alkaryl-, and aryl sulphonates and sulphates having at least 6 carbon atoms, having less than 5% moisture content, about 1–40% by weight of a non-toxic solid acid compound capable of combining with the calcium of said hypochlorite having less than 1% moisture content and selected from the group consisting of alkali metal acid sulphates, alkali metal acid phosphates, alkali metal acid pyrophosphates, alkali metal carboxylic acid salts in which the number of metallic ions is at least one less than the number of carboxylic groups, alkali metal hydrocarbon sulphonates, and alkali metal sulphates of long-chain alcohols and about 5–45% by weight of an inert salt selected from the group consisting of alkali, alkaline earth, and magnesium salts having less than 1% moisture content in a substantially anhydrous atmosphere to a temperature between about 150–190° C., each of said components having a particle size between about 20 and 200 mesh.

7. The product of the process of claim 1.

8. The product claimed in claim 7 wherein said hydrocarbon is an alkyl benzene having about 10 to 16 carbon atoms in said alkyl.

9. The product claimed in claim 8 wherein said alkyl is $C_{15}H_{31}$.

References Cited by the Examiner

UNITED STATES PATENTS

| | | | |
|---|---|---|---|
| 2,149,240 | 2/1939 | Crossley | 167—58 |
| 2,320,279 | 5/1943 | Kalusdian | 252—102 |
| 2,333,830 | 11/1943 | Toone | 260—505 |
| 2,703,330 | 3/1955 | Bloch et al. | 260—505 |
| 2,738,365 | 3/1956 | Sylvester | 260—505 |
| 2,804,466 | 8/1957 | Schurman | 260—505 |
| 3,141,821 | 7/1964 | Compeau | 167—58 |

OTHER REFERENCES

Bacon et al.: J. Intern. Col. of Surgeons, vol. 30, No. 5, November 1958, pages 539–546.

Gleidman et al.: Surgical Forum, vol. 8, 1958, pages 104–108.

LORRAINE A. WEINBERGER, *Primary Examiner.*

LEON ZITVER, *Examiner.*

B. M. EISEN, *Assistant Examiner.*